Oct. 31, 1961  S. RAPPAPORT ET AL  3,006,545
AUTOMATIC MECHANICAL GEAR TOOTH COUNTER
Filed Oct. 19, 1959  5 Sheets-Sheet 1
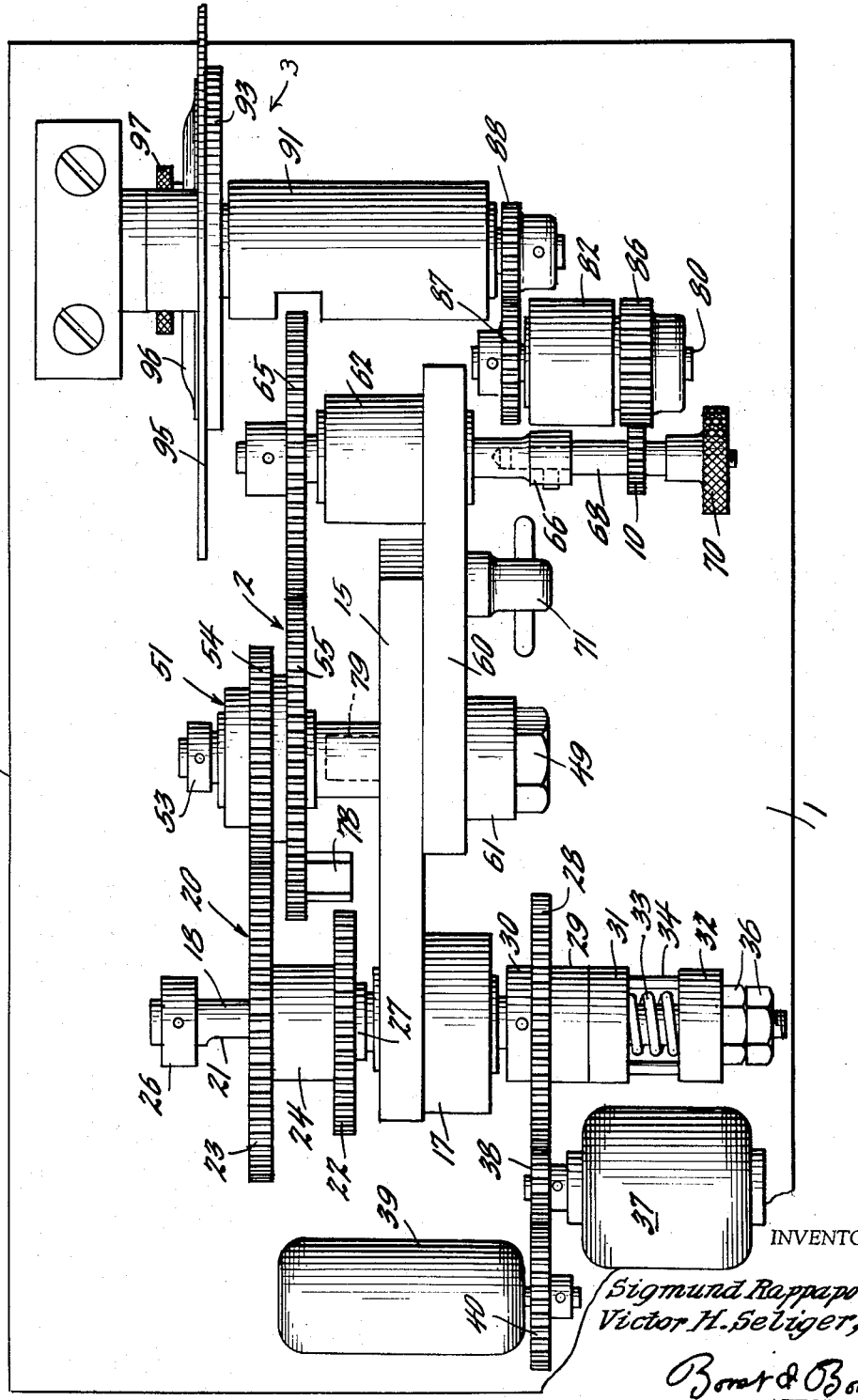
INVENTORS
Sigmund Rappaport
Victor H. Seliger,
Bonet & Bonet
ATTORNEYS

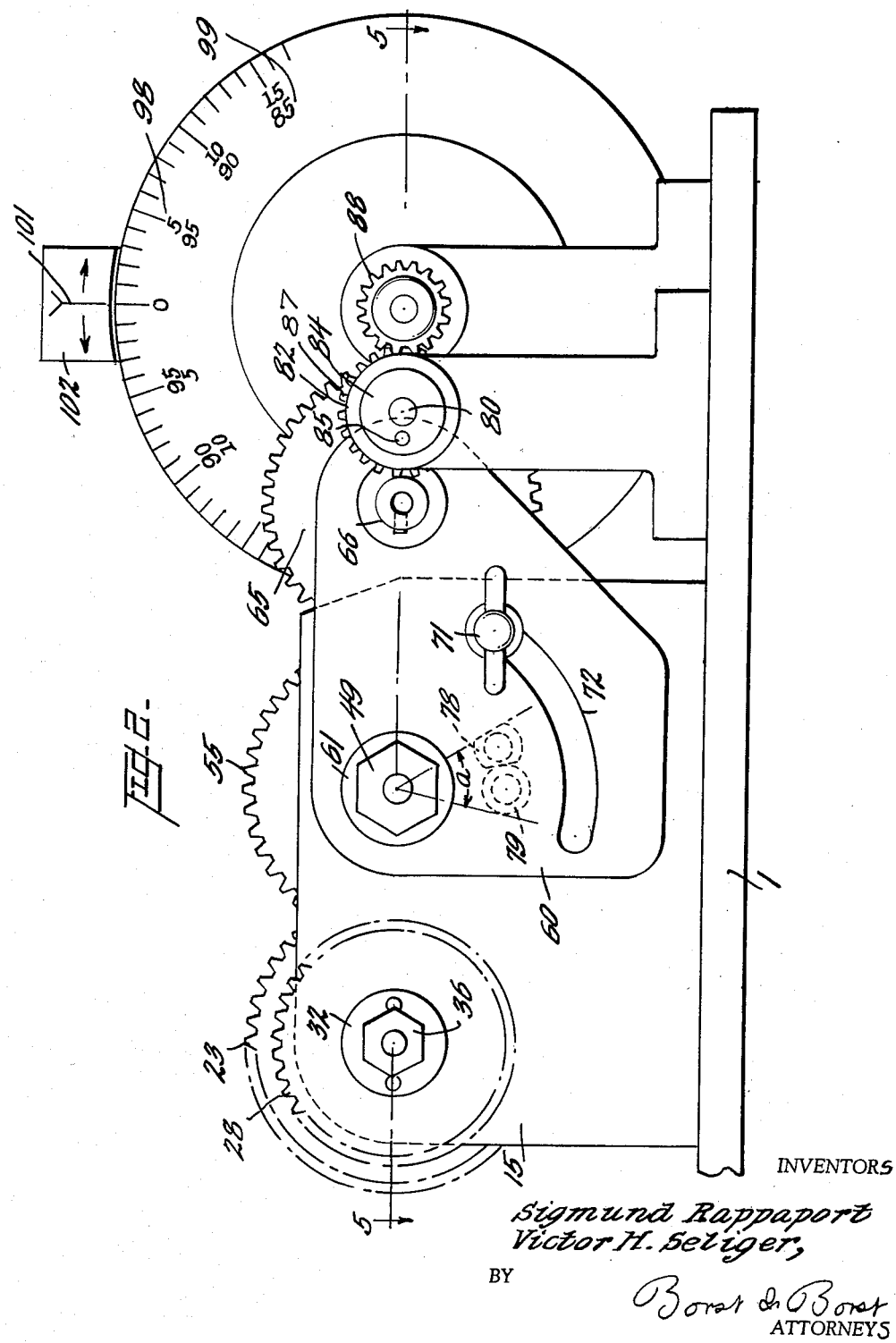

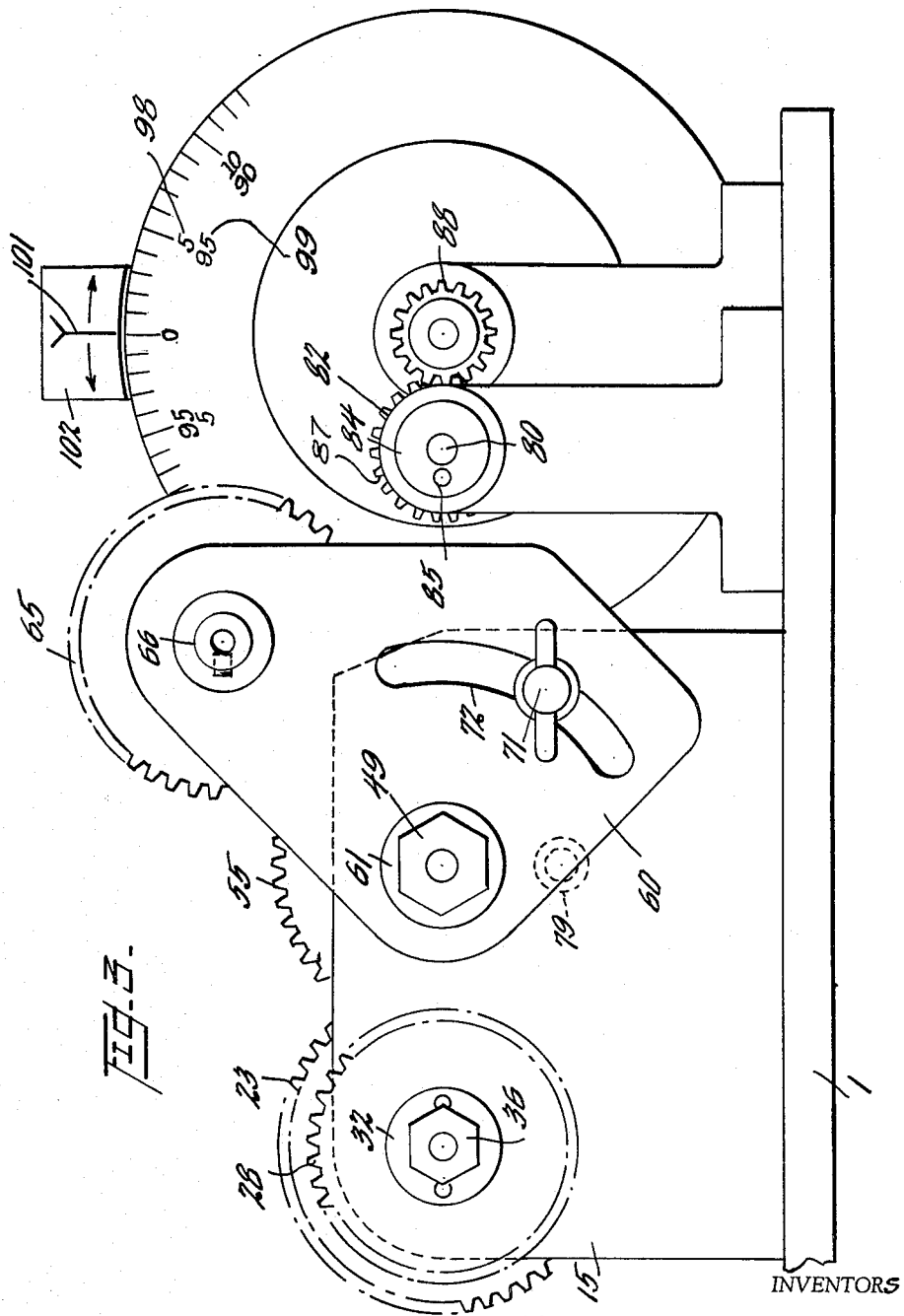

Oct. 31, 1961   S. RAPPAPORT ET AL   3,006,545
AUTOMATIC MECHANICAL GEAR TOOTH COUNTER
Filed Oct. 19, 1959   5 Sheets-Sheet 4
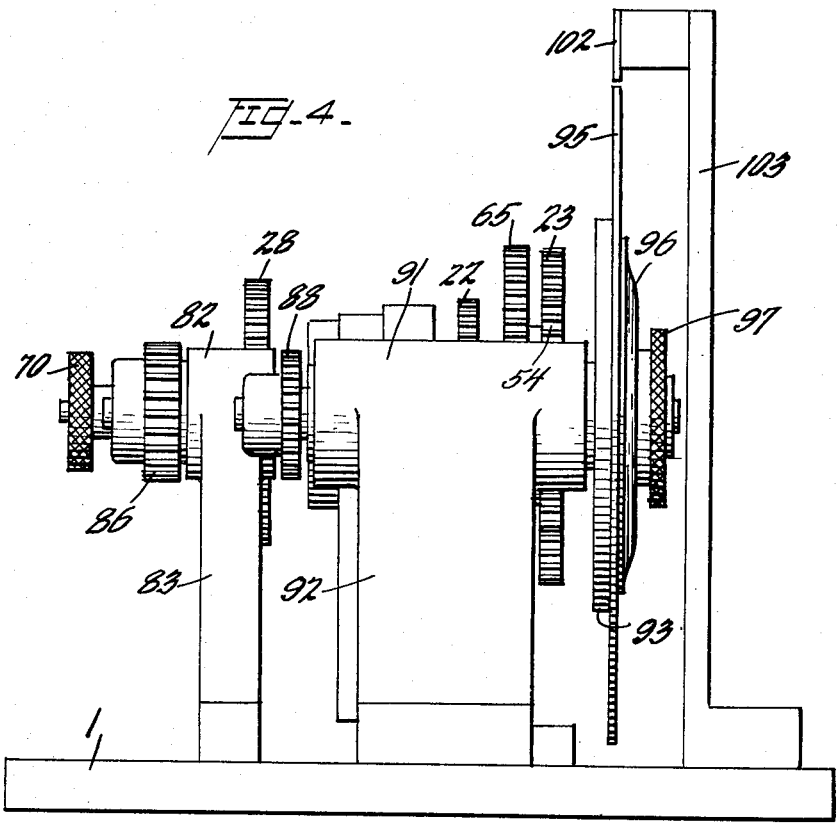
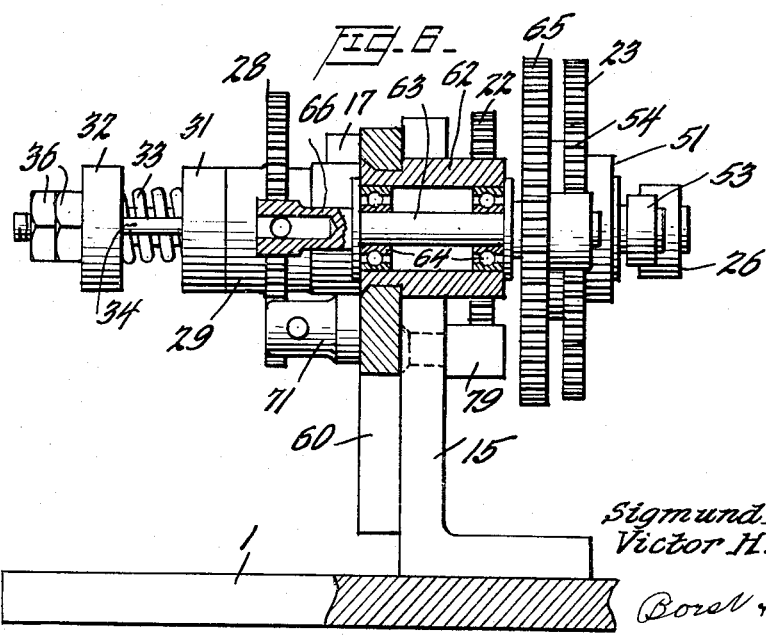
INVENTORS
Sigmund Rappaport
Victor H. Seliger,
Borst & Borst
ATTORNEYS

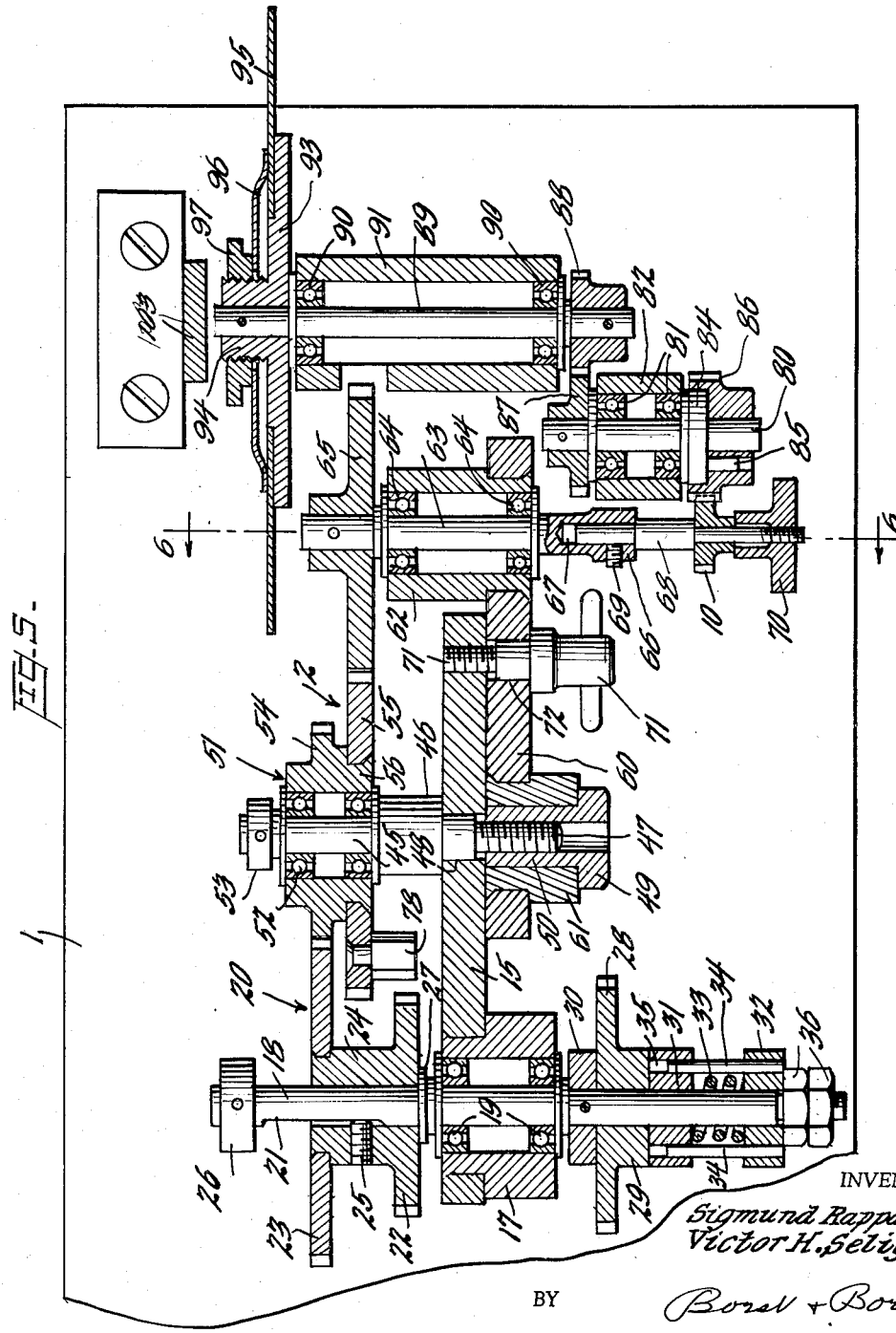

United States Patent Office 3,006,545
Patented Oct. 31, 1961

3,006,545
AUTOMATIC MECHANICAL GEAR TOOTH COUNTER
Sigmund Rappaport, Port Washington, and Victor H. Seliger, Kew Gardens, N.Y., assignors to Sperry Rand Corporation, Ford Instrument Company Division, Wilmington, Del., a corporation of Delaware
Filed Oct. 19, 1959, Ser. No. 847,234
9 Claims. (Cl. 235—91)

This invention relates to a gear checking mechanism by which the number of teeth on a gear are quickly, accurately and automatically counted. The mechanism disclosed and claimed in this application is a modification and improvement of the "Gear Tooth Counter" disclosed in the copending application of Sigmund Rappaport, Serial No. 780,277, which was filed on December 15, 1958.

Heretofore, with the exception of the aforesaid copending application, the number of teeth in a gear was determined by manually counting the number of teeth in a gear, or when the tooth pitch was known, by measuring the outside diameter of the gear, and thereby determining the number of teeth therein. Both of these methods are slow, tedious and subject to error. The device of the aforesaid copending application while being quick and automatic in operation has been found by experience to be unreliable when counting the teeth of a gear having a tooth pitch of 64 or finer, since particles of dust or dirt register on the counter as a gear tooth.

It is therefore the object of the present invention to provide a gear tooth counting mechanism by which the teeth of a gear, regardless of how fine the tooth thereof, may be accurately and quickly automatically counted.

Another object of the invention is to provide a mechanism of the aforesaid character which is of simple construction and is relatively inexpensive to manufacture.

In the aforesaid copending application means were provided by which various different test gears, within the capacity of the mechanism, were mounted and rotated, and by which the tooth spaces of a gear were electronically counted. The present invention utilizes the same gear mounting and rotating mechanism of the aforesaid copending application and provides means by which the teeth of a gear are mechanically counted.

The apparatus of the present invention comprises generally a base plate on which the entire mechanism, including a frame plate which is secured to the base plate and extends upwardly therefrom, is mounted.

A main drive shaft is rotatably mounted in the frame plate by suitable antifriction bearings. The drive shaft is driven by a reversible motor through a spur gear which is rotatably mounted on the drive shaft and is yieldingly connected thereto by a spring loaded friction clutch. A cluster gear which consists of two spur gears of different pitch diameters mounted on the same hub is slidably keyed on the main drive shaft adjacent the rear face thereof. The frame plate is also provided with a fixed nonrotatably mounted shaft on which a sun gear consisting of two different pitch diameter spur gears secured to the same hub is rotatably mounted, adjacent the rear face of the frame plate. An arm, which is rotatably mounted on the fixed shaft adjacent the front face of the frame plate, has a driven shaft rotatably mounted thereon by means of suitable antifriction bearings adjacent the free end thereof. A planet gear which is rigidly secured to the rear end of the driven shaft, constantly meshes with the larger spur gear of the sun gear. The larger and smaller spur gears of the cluster gear are adapted to be selectively shifted into meshing engagement with the smaller and larger spur gears, respectively, of the sun gear. It will thus be seen that for a fixed r.p.m. of the main drive shaft the planet gear, and with it, the driven shaft, will be rotated at a high or low speed depending on the particular meshing of the cluster and sun gears. The forward end of the driven shaft is provided with a socket in which an adapter is removably clamped for rotation therewith. A test gear, whose teeth are to be counted, is removably secured to the adapter for rotation therewith. The arm carrying the driven shaft, and with it the adapter and test gear, is rotatably adjustable in accordance with the size of the test gear being checked and can be clamped in a fixed position by suitable clamping means.

The larger gear of the sun gear, which meshes with the planet gear, is provided with a stop which is adapted to engage first one side and then the other side of an abutment which is secured to the rear face of the frame plate in the path of the stop. In operation the sun gear is rotated in first one direction and then the other, and the ratio between the planet gear and the meshing gear of the sun gear is such that the planet gear, and with it the adapter and a test gear mounted thereon, will be rotated 360° when the sun gear is rotated in either direction from one stop position to the other. Just prior to the engagement of the stop with the abutment the motor is automatically deenergized by means of a limit switch. After each stoppage the motor is reversed by suitable manually operated switching means.

A master shaft is rotatably mounted, by antifriction bearings, which are carried by the upper end of a post which is secured to the base plate and extends upwardly therefrom. The rear end of the master shaft is provided with a spur gear which meshes with a spur gear secured to the forward end of an indicator shaft which is rotatably mounted by antifriction bearings in the upper end of a second post which is secured to and extends upwardly from the base plate. The rear end of the indicator shaft has a visual indicating dial frictionally secured thereon for rotation therewith, which cooperates with a fixed index mark. The dial is graduated both clockwise and counterclockwise from 0 to 100.

A master gear, having the same tooth pitch as the test gear, is removably secured to the forward end of the master shaft in mesh with the test gear. The ratio of the meshing gears between the master shaft and the indicator shaft is such that an angular displacement of one tooth on the test gear, and consequently the master gear, results in the angular displacement of the indicator dial by one graduation.

A plurality of master gears, all having the same number of teeth but a different tooth pitch, are provided. In operation the master gear having the same tooth pitch as the test gear is selected and used.

Having stated the principal objects of the invention other and more limited objects will be apparent from the following specification and the accompanying drawings forming a part thereof in which:

FIG. 1 is a plan view of a gear tooth counting mechanism, embodying our invention, showing it set for counting the teeth of the smallest gear capable of being handled by the mechanism;

FIG. 2 is a front elevation of the mechanism as shown in FIG. 1 with the drive motor, limit switch, test gear and master gear removed;

FIG. 3 is a view similar to FIG. 2 showing the mechanism set for counting the teeth of a larger gear having a coarser tooth pitch;

FIG. 4 is a side elevation of the mechanism looking from the right of FIG. 2;

FIG. 5 is a horizontal section taken on the line 5—5 on FIG. 2; and

FIG. 6 is a vertical transverse section taken on the line 6—6 on FIG. 5.

Referring now to the drawings in detail by reference characters, the numeral 1 indicates a base plate on which the various component parts of the mechanism are mounted. The mechanism comprises generally a test gear holding and rotating apparatus 2, and a mechanical counting apparatus 3 which is actuated by the test gear 10 being checked.

The test gear holding and rotating mechanism 2 comprises a vertically disposed frame plate 15 which is secured to the base plate 1. Adjacent one end thereof the frame plate 15 is provided with a bushing 17 in which a drive shaft 18 is rotatably mounted by means of ball bearings 19. The shaft 18 which extends out beyond the front and rear faces of the frame plate 15 has a cluster gear 20 slidably mounted thereon, rearwardly of the frame plate 15, and is provided with a flattened section 21. The cluster gear 20 consists of a spur gear 22 and a larger spur gear 23, both of which are mounted on a hub 24. A set screw 25 carried by the hub 24 is adapted to engage the flattened section 21 of the shaft 18 to secure the cluster gear 20 to the shaft 18 for rotation therewith and to maintain the cluster gear in adjusted position. Collars 26 and 27 limit the movement of the cluster gear 20 in each direction.

A spur gear 28 having a hub 29 is rotatably mounted on the shaft 18, forwardly of the frame plate 15, between a Bakelite disk 30, which is pinned on the shaft 18, and a Bakelite disk 31 which is slidably mounted on the shaft 18. A collar 32 is slidably mounted on the shaft 18 in spaced relation to the disk 31, with a coiled compression spring 33 disposed about the shaft 18 between the disk 31 to collar 32. The collar 32 carries a pair of pins 34 which extend into apertures 35 in the disk 31, whereby the disk 31 and collar 32 are constrained to rotate in unison. The collar 32 is retained upon the shaft 18 by a pair of nuts 36 and is adjustable back and forth thereon by the nuts 36. The pressure of the spring 33, and consequently the pressure with which the gear 28 is gripped between the disks 30 and 31, may be varied by adjusting the position of the collar 32 by the nuts 36. It will therefore be seen that the parts 30 to 36 constitute an adjustable friction disk clutch by which the gear 28 is yieldingly connected to the shaft 18. The shaft 18 is adapted to be rotated in either direction through the gear 28 by a reversible motor 37 and motor pinion 38. The motor 37 also drives a limit switch mechanism 39 through the pinion 38 and a gear 40 carried by the limit switch mechanism 39. The limit switch mechanism 39 is of standard construction. Consequently it is not shown and described in detail herein. Many different types are commercially available, any one of which can be used equally well herein.

A fixed stud shaft 45 having an enlarged mid-section 46 and a threaded forward end 47 is nonrotatably secured in an aperture 48 in the frame plate 15 by a nut 49 having an elongated interiorly threaded cylindrical hub 50. A sun gear 51 is rotatably mounted by ball bearings 52 upon the rear end of the shaft 45 and is retained in fixed position by a collar 53. The sun gear 51 consists of a spur gear 54 and a larger spur gear 55 which is secured to the hub 56 of the gear 54. The sun gear 51 is adapted to be driven at either one of two selected speeds by the cluster gear 20 in order to accommodate the counter mechanism 3 for checking different size test gears. When the larger gear 23 of the cluster gear 20 is in mesh with the smaller gear 54 of the sun gear 51 as shown herein the sun gear is driven at the higher speed. When it is desired to drive the sun gear at the lower speed the cluster gear 20 is adjusted rearwardly on the shaft 18 until the smaller gear 22 thereof is in mesh with the larger gear 55 of the sun gear 51.

An arm 60 is rotatably mounted upon the elongated hub 50 of the nut 49 by means of a bushing 61 which is carried by the arm 60 adjacent one end thereof. The free end of the arm 60 is provided with a bushing 62 in which a shaft 63 is rotatably mounted by means of ball bearings 64. The shaft 63 has a gear 65 pinned on the rear end thereof which permanently meshes with the larger gear 55 of the sun gear 51. The enlarged forward end 66 of the shaft 63 is provided with a bore 67 in which an adapter 68, by which a test gear the teeth of which are to be counted is removably secured to the shaft 63 for rotation therewith, by means of a set screw 69. The arm 60 is adapted to be moved back and forth between the positions shown in FIGS. 2 and 3 in accordance with the size and pitch of the test gear mounted on the adapter 68, the teeth of which are to be counted. The adapter 68 is provided with a hand nut 70 in order to frictionally hold a test gear thereon for rotation with the shaft 63 and adapter 68. The arm 60 is adapted to be held in adjusted positions between the positions shown in FIGS. 2 and 3 by a thumb screw 71 which is carried by the frame plate 15 and extends through an arcuate slot 72 in the arm 60 which is concentric with the axis rotation of the arm 60.

The larger gear 55 of the sun gear 51 carries a stop 78 which is adapted to engage first one side and then the other side of a fixed abutment 79 which is secured to the frame plate 15 in the path of the stop 78. The gears 55 and 65 are so proportioned that the gear 65, and consequently the shaft 63 and a test gear secured thereto, will be rotated 360° each time the stop 78 is rotated by the gear 55 from one side of the abutment 79 to the other side thereof. As shown herein the angle "a" (FIG. 2) is 40°. Therefore the gear 65 will be rotated 360° for each 320° rotation of the gear 55 in either direction. The ratio between the gears 55 and 65 is therefore nine to eight in which the gear 55 has sixty-three teeth and the gear 65 has fifty-six teeth. In counting the teeth of test gears having one hundred teeth or more the cluster gear 20 is so adjusted that the smaller gear 22 thereon is in mesh with the larger gear 55 of the sun gear 51; and in counting the teeth of test gears having less than one hundred teeth the cluster gear 20 is so adjusted that the larger gear 23 thereof is in mesh with the smaller gear 54 of the sun gear 51.

The counting apparatus 3 comprises a master gear shaft 80 which is rotatably mounted, by antifriction bearings 81, in a cage 82 which is carried by a post 83 secured to and extending upwardly from the base plate 1. The shaft 80, adjacent the forward end thereof, is provided with a collar 84 having a forwardly extending dowel pin 85 by means of which a master gear 86 is removably mounted on the shaft 80. The shaft 63 and adapter 68 are so positioned with repect to the shaft 80 that a master gear 86 mounted on the shaft 80 will mesh with a test gear 10 mounted on the adapter 68.

The rear end of the shaft 80 has a gear 87 secured thereon which meshes with a gear 88 secured on the forward end of an indicator shaft 89 which is rotatably mounted, by means of antifriction bearings 90, in a cage 91 carried by the upper end of a post 92 which is secured to and extends upwardly from the base 1. A disk 93 having an exteriorly threaded hub 94 is secured on the rear end of the shaft 89. An indicating ring-shaped dial 95 is frictionally secured on and to the disk 93 by means of a spring washer 96 and a hand nut 97 threaded onto the hub 94. The front face of the dial 95, adjacent the periphery thereof, is provided with two concentric rows of graduations, one of which 98 is graduated clockwise from 0 to 100 and the other of which 99 is graduated counterclockwise from 0 to 100. The two rows of graduations 98 and 99 are preferably contrastingly colored. The rows of graduations 98 and 99 are adapted to register with a fixed index mark 101 on a plate 102 which overlies the dial 95 and is carried by the upper end of a post 103 which is secured to and extends upwardly from the base plate 1. The plate 102 has two arrows, preferably in contrasting colors, indicated thereon, the colors indicating the color of the graduations to be read on dial 95 depending upon direction of rotation of dial 95. The ratio of the meshing gears 87 and 88 between the shafts 80 and 89 is such that the angular displacement of one tooth on the test gear 10, and consequently the master gear 86, will result in the angular displacement of the indicator dial 95 by one graduation.

A plurality of master gears 86 are provided, all of which have the same number of teeth but each of which has a different tooth pitch; and a plurality of adapters 68 are provided in accordance with the shaft bores of the various different test gears to be checked.

In operation a master gear 86, having the same tooth pitch as the test gear 10 to be checked, is selected and placed upon the shaft 80 as shown in FIG. 5. An adapter 68 is selected in accordance with shaft bore of the test gear to be checked and applied to the shaft 63. The test gear is then applied to the adapter and clamped thereon, for rotation therewith, by the hand nut 70. The test gear rotating mechanism 2 is then set with the stop 78 in engagement with one side of the abutment 79 as shown in FIG. 2. The arm 60, carrying the shaft 63, is then adjusted about its pivot axis until the test gear 10 is properly meshed with the master gear 86, after which the arm 60 is clamped in fixed position by the thumb screw 71. The dial 95 is then set with the "0" graduation in register with the index mark 101, the frictional mounting of the dial 95 permitting such setting independently of the shaft 89. The rotating mechanism 2 is then driven, by the motor 37, in the proper direction to move the stop 78 out of engagement with one side of the abutment 79 and into engagement with the opposite side thereof. As previously stated, the ratio between the gear 55 carrying the stop 78 and gear 65 secured on the shaft 63 is such that the shaft 63, and consequently a test gear secured thereto, will be rotated 360° during the movement of the stop 78 from one side of the abutment 79 to the other side thereof by the gear 55.

The test gear 10 rotates the master gear 86 and shaft 80 which, through the gears 87 and 88, rotates the shaft 89 and dial 95 mounted thereon. As previously stated the ratio between the gears 87 and 88 is such that the dial 95 will be advanced one graduation per each tooth advancement of the test gear 10 and master gear 86. After the test gear 10 has been rotated one revolution and stopped by the engagement of the stop 78 with the opposite side of the abutment 79 the number of teeth on the test gear can be read directly from the dial 95.

After the test gear has been rotated one revolution in one direction a double check may be had by rotating the test gear one revolution in the opposite direction. For example, assume that a test gear has seventy-five teeth. After the test gear has been rotated one revolution in one direction the graduation "75" in one or the other of the two rows of graduations 98 and 99, depending on the direction in which the test gear was rotated, will register with the index mark 101. Then after rotating the test gear one revolution in the opposite direction the "0" graduation will register with the index mark 101.

If the master gears each had one hundred teeth the ratio between the gears 87 and 88 would be one to one. But in order to accommodate the apparatus for checking very small gears we preferably provide the master gears with more than one hundred teeth which spaces the axis of the shaft 80 further away from the axis of the shaft 63 thereby providing the necessary clearance between the cage 82, in which the shaft 80 is mounted, and the enlarged end 66 of the shaft 63. As shown herein we provide the master gears with one hundred and twenty teeth. The ratio between the gears 87 and 88 is therefore six to five.

Generally the mechanism is used to successively check a large number of similar gears having the same tooth pitch and pitch diameter, which requires only one setting of the mechanism for each batch of similar gears. All that is necessary is to remove each test gear, after it has been checked, from the adapter 68 and place the next gear to be checked thereon.

From the foregoing it will be apparent to those skilled in this art that we have provided a very simple and efficient mechanism for accomplishing the objects of the invention.

It is to be understood that we are not limited to the specific construction shown and described herein, as various modifications may be made therein within the spirit of the invention and the scope of the appended claims.

What is claimed is:

1. A gear tooth counting apparatus of the character described comprising a rotatably mounted test gear shaft adapted to have a test gear the teeth of which are to be counted, removably secured thereon for rotation therewith; a master gear shaft rotatably mounted in fixed position; a plurality of master gears all having the same number of teeth but each having a different tooth pitch, means by which any selected one of said plurality of master gears may be removably mounted on said master gear shaft in mesh with a test gear mounted on said test gear shaft, the tooth pitch of said selected one of said plurality of master gears being the same as the tooth pitch of a test gear mounted on said test gear shaft; an indicator shaft rotatably mounted in fixed position adjacent said master gear shaft; a graduated indicator dial mounted on said indicator shaft; a pair of meshing gears one of which is secured on said master gear shaft and the other of which is secured on said indicator shaft; means by which said test gear shaft and a test gear mounted thereon are rotated, the rotation of said test gear imparting rotation to said master gear shaft through the said selected one of said master gears mounted thereon, and said master gear shaft imparting revolution to said indicator shaft and said dial mounted thereon through said pair of meshing gears; the ratio of said pair of meshing gears being such that said dial is advanced one graduation per advancement of each tooth on said test gear.

2. A gear tooth counting mechanism as defined by claim 1 in which said test gear shaft is carried by the free end of a pivoted arm which is adapted to be arcuately adjusted to bring said test gear into proper mesh with the said selected one of said master gears mounted on said master gear shaft, and means by which said arm is clamped in adjusted position.

3. A gear tooth counting mechanism as defined by claim 2 in which said indicator dial is provided with two concentric rows of graduations one of which is graduated clockwise from 0 to 100 and the other of which is graduated counterclockwise from 0 to 100.

4. A gear tooth counting mechanism as defined by claim 3 in which said indicator dial is frictionally secured on said indicator shaft.

5. A gear tooth counting mechanism as defined by claim 1 in which stop means is provided by which said test gear shaft is constrained for alternate rotation through one revolution only in first one direction and then in the opposite direction.

6. A gear tooth counting mechanism as defined by claim 5 in which means are provided by which said test gear shaft is rotated at a selected one of a plurality of different speeds.

7. A gear tooth counting apparatus as defined by claim 1 in which said test gear shaft rotating means comprises a vertically disposed frame plate, a transversely extending pivot shaft carried by said frame plate, an intermediate gear rotatably mounted on said pivot shaft, drive means by which said intermediate gear is selectively rotated in either direction, an angularly adjustable arm rotatably mounted on said pivot shaft, means by which said arm is clamped in adjusted position, said test gear shaft being mounted on said adjustable arm adjacent the free end thereof, a spur gear secured to one end of said test gear shaft in mesh with said intermediate gear whereby said test gear shaft is rotated by said intermediate gear, and a means carried by the opposite end of said test gear shaft by which a test gear the teeth of which are to be counted is removably secured to said test gear shaft for rotation therewith.

8. A gear tooth counting apparatus as defined by claim 7 in which said intermediate gear has a stop secured thereto which is adapted to engage first one side and then the other side of a fixed abutment which is secured to said frame plate in the path of said stop, and in which the ratio between said intermediate gear and said spur gear is such that said spur gear and with it said test gear shaft are rotated 360° when said intermediate gear is rotated from one stop position to the other.

9. A gear tooth counting apparatus as defined by claim 8 in which means are provided by which said intermediate gear is adapted to be rotated at a selected one of a plurality of different speeds.

References Cited in the file of this patent

UNITED STATES PATENTS

| | | |
|---|---|---|
| Re. 15,013 | Saurer | Dec. 21, 1920 |
| 50,307 | Walcott | Oct. 3, 1865 |
| 1,084,632 | Heuser | Jan. 20, 1914 |
| 1,226,559 | Mason | May 15, 1917 |
| 1,411,629 | Jackson | Apr. 4, 1922 |

FOREIGN PATENTS

| | | |
|---|---|---|
| 967,138 | France | Mar. 22, 1950 |